United States Patent
Gooding

(10) Patent No.: US 10,227,803 B2
(45) Date of Patent: Mar. 12, 2019

(54) LOCKING DEVICE

(71) Applicant: Huntington Ingalls, Inc., Newport News, VA (US)

(72) Inventor: David Albert Gooding, Newport News, VA (US)

(73) Assignee: Huntington Ingalls Incorporated, Newport News, VA (US)

( * ) Notice: Subject to any disclaimer, the term of this patent is extended or adjusted under 35 U.S.C. 154(b) by 1023 days.

(21) Appl. No.: 14/487,688

(22) Filed: Sep. 16, 2014

(65) Prior Publication Data

US 2015/0076836 A1 Mar. 19, 2015

Related U.S. Application Data

(60) Provisional application No. 61/960,348, filed on Sep. 16, 2013.

(51) Int. Cl.
| | |
|---|---|
| *E05C 19/14* | (2006.01) |
| *E05C 3/12* | (2006.01) |
| *E05B 51/02* | (2006.01) |
| *E05B 65/00* | (2006.01) |
| *E05C 5/00* | (2006.01) |
| *E05B 17/00* | (2006.01) |

(Continued)

(52) U.S. Cl.
CPC .......... *E05C 19/14* (2013.01); *E05B 17/0029* (2013.01); *E05B 51/02* (2013.01);
(Continued)

(58) Field of Classification Search
CPC ........... Y10T 292/087; Y10T 292/0871; Y10T 292/0875; Y10T 292/0886; Y10T 292/089; Y10T 292/1043; Y10T 292/1076; Y10T 292/108; Y10T 292/1095; Y10T 292/1097; Y10T 292/1098; Y10T 292/20; Y10T 292/202; Y10T 292/225; Y10T 292/0913; Y10T 292/0917; Y10T 292/1082; Y10S 292/49; B25B 1/00; B25B 3/00; B25B 5/00; E05C 19/14; E05C 3/12; E05C 3/124; E05C 3/16; E05C 3/162; E05C 3/165;
(Continued)

(56) References Cited

U.S. PATENT DOCUMENTS

| | | | |
|---|---|---|---|
| 2,679,427 A | 5/1954 | Johnson | |
| 2,834,504 A * | 5/1958 | Annicq | ..................... F16J 13/06 |
| | | | 292/201 |

(Continued)

FOREIGN PATENT DOCUMENTS

GB   2177151 A  *  1/1987  ............. E05C 19/14

OTHER PUBLICATIONS

PCT International Search Report for International Application No. PCT/US2014/055865, dated Dec. 31, 2014, 2 pages.

*Primary Examiner* — Alyson M Merlino
(74) *Attorney, Agent, or Firm* — Hunton Andrews Kurth LLP

(57) ABSTRACT

A linkage mechanism is disclosed that produces high travel advantage in one phase of linear actuator motion and high mechanical advantage in another phase of linear actuator motion. The linkage mechanism may be powered by a hydraulic actuator system and is capable of producing high preloads and a high amount of travel with minimal actuator motion or force. The linkage mechanism may be used to secure a hatch door to a pressure vessel housing or may be used in any environment involving high pressure differentials, for example.

17 Claims, 16 Drawing Sheets

(51) Int. Cl.
  *F16J 13/08* (2006.01)
  *F16J 13/18* (2006.01)
(52) U.S. Cl.
  CPC .............. *E05B 65/001* (2013.01); *E05C 3/12* (2013.01); *E05C 5/00* (2013.01); *F16J 13/08* (2013.01); *F16J 13/18* (2013.01); *Y10T 292/1076* (2015.04)
(58) Field of Classification Search
  CPC ...... E05C 3/167; E05C 5/00; E05C 2005/005; E05B 17/0025; E05B 17/0029; E05B 51/02; E05B 65/001; F16J 13/08; F16J 13/18
  USPC ............................................ 269/228, 43, 32
  See application file for complete search history.

(56) References Cited

U.S. PATENT DOCUMENTS

| | | | | |
|---|---|---|---|---|
| 2,941,432 A * | 6/1960 | Williamson | ........... | B21D 25/04 |
| | | | | 269/32 |
| 2,984,176 A * | 5/1961 | Sommer | ............ | B21D 37/04 |
| | | | | 100/295 |
| 3,027,155 A * | 3/1962 | Paterson | ............ | B25B 5/122 |
| | | | | 269/32 |
| 3,545,050 A * | 12/1970 | Blatt | ............ | B25B 5/122 |
| | | | | 24/457 |
| 3,696,774 A | 10/1972 | Ostrem | | |
| 3,722,936 A * | 3/1973 | Stubert | ............ | E05L 351/02 |
| | | | | 292/256.75 |
| 3,888,528 A | 6/1975 | Jericijo | | |
| 4,496,138 A * | 1/1985 | Blatt | ............ | B25B 5/064 |
| | | | | 269/32 |
| 4,679,782 A * | 7/1987 | Horn | ............ | B25B 5/061 |
| | | | | 269/228 |
| 5,287,602 A * | 2/1994 | Dykstra | ............ | E05C 19/14 |
| | | | | 24/463 |
| 5,413,390 A * | 5/1995 | Filippi | ............ | B60J 7/192 |
| | | | | 292/201 |
| 7,252,311 B2 | 8/2007 | Pratt et al. | | |
| 2005/0012258 A1* | 1/2005 | Migliori | ............ | B25B 5/122 |
| | | | | 269/32 |
| 2009/0283634 A1 | 11/2009 | Tran | | |
| 2012/0056384 A1* | 3/2012 | Fleischer | ............ | B25B 5/062 |
| | | | | 277/500 |

* cited by examiner

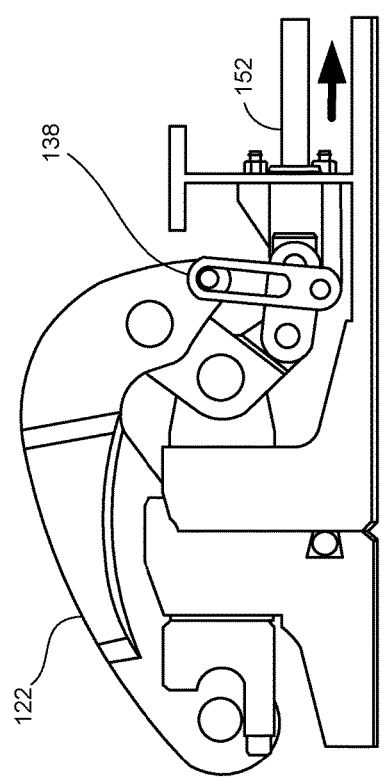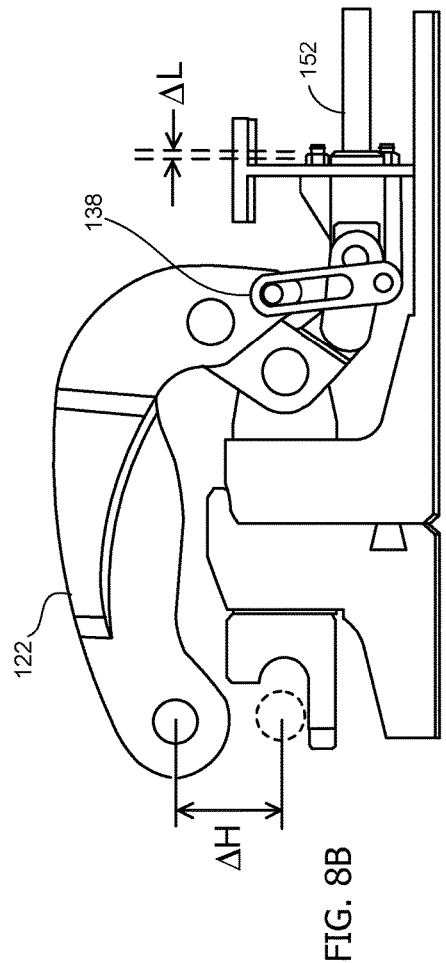
FIG. 8A
FIG. 8B

LOCKING DEVICE

REFERENCE TO RELATED APPLICATION

This application claims priority to U.S. Provisional Patent Application 61/960,348, filed on Sep. 16, 2013, the complete disclosure of which is incorporated herein by reference.

FIELD OF THE INVENTION

The present invention relates generally to the field of devices for securing hatches, doors and the like, and more particularly to a locking device that can be used to secure a closure for a pressure vessel.

BRIEF DESCRIPTION OF THE DRAWINGS

The invention can be more fully understood by reading the following detailed description together with the accompanying drawings, in which like reference indicators are used to designate like elements, and in which:

FIGS. 8A-8B are illustrations of the locking device depicting travel advantage.

DESCRIPTION OF THE INVENTION

Reference will be made in detail to exemplary embodiments, examples of which are illustrated in the accompanying drawings. It should be appreciated that the same reference numbers will be used throughout the drawings to refer to the same or like parts. The following description is intended to convey a thorough understanding of the embodiments described by providing a number of specific embodiments. It should be appreciated that the following detailed descriptions are exemplary and explanatory only and are not restrictive. As used herein, any term in the singular may be interpreted to be in the plural, and alternatively, any term in the plural may be interpreted to be in the singular.

The present invention is a locking mechanism that can be used with any form of hatch, cover, lid or door, but is of particular use in securing an end closure of a pressure vessel. While the locking mechanism can be used in conjunction with any closure configuration, it will be described in conjunction with an exemplary pressure vessel shown in FIG. 1A. Exemplary pressure vessel housing 20 in FIG. 1A has a cylindrical main housing with a hinged, full diameter hatch door 10 at one end. Hatch door 10 may rotate about a hinge 15 between a closed position, shown in FIG. 1A, and an open position, show in FIG. 1B. Pressure vessel housing 20 and hatch door 10 can be formed from any suitable metal, plastic, composite or other material. The hatch door 10 may be secured in the closed position using a locking mechanism.

Figure 1A:
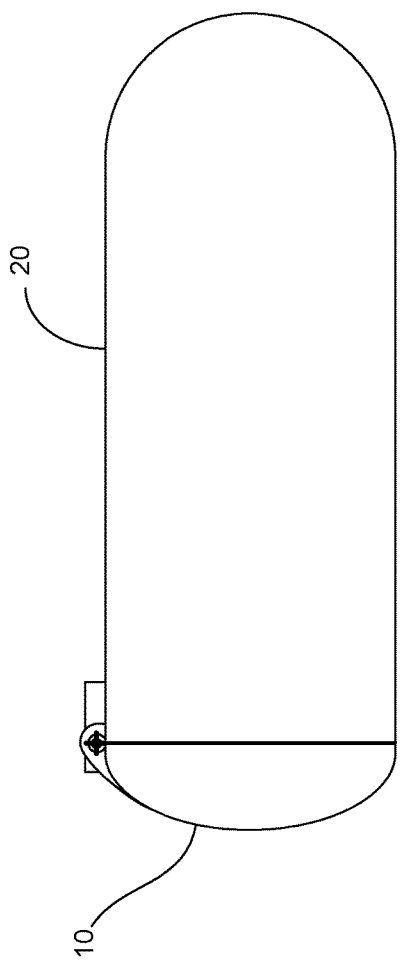
FIGS. 1A and 1B illustrate a pressure vessel with a hatch door that is securable using a locking device according to an embodiment of the invention.
Figure 1B:
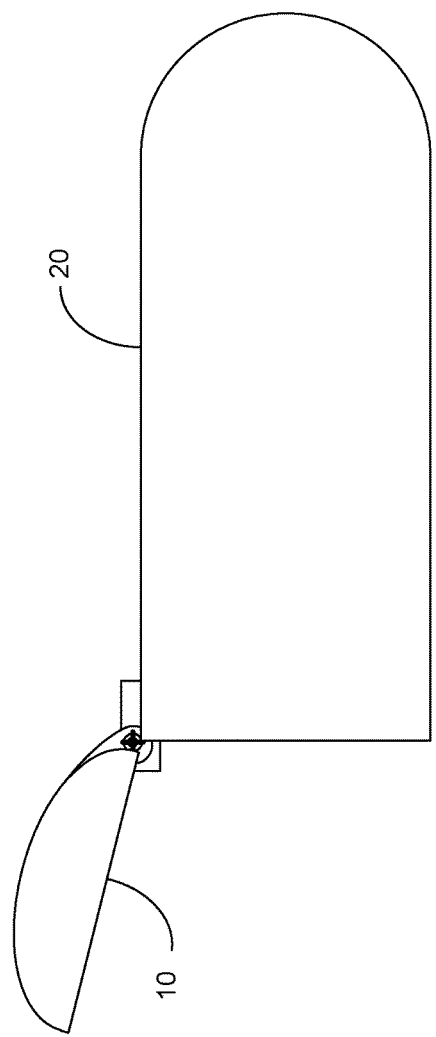

Locking mechanisms for pressure vessels like the exemplary pressure vessel housing 20 and hatch door 10 in FIGS. 1A-1B may be required to assure a seal against high differential pressure loads, either internally directed (high external pressure and low internal pressure) or externally directed (high internal pressure and low external pressure). In some cases, the locking mechanism may be mounted externally, but in some instances, internal mounting may be required.

Figure 2:
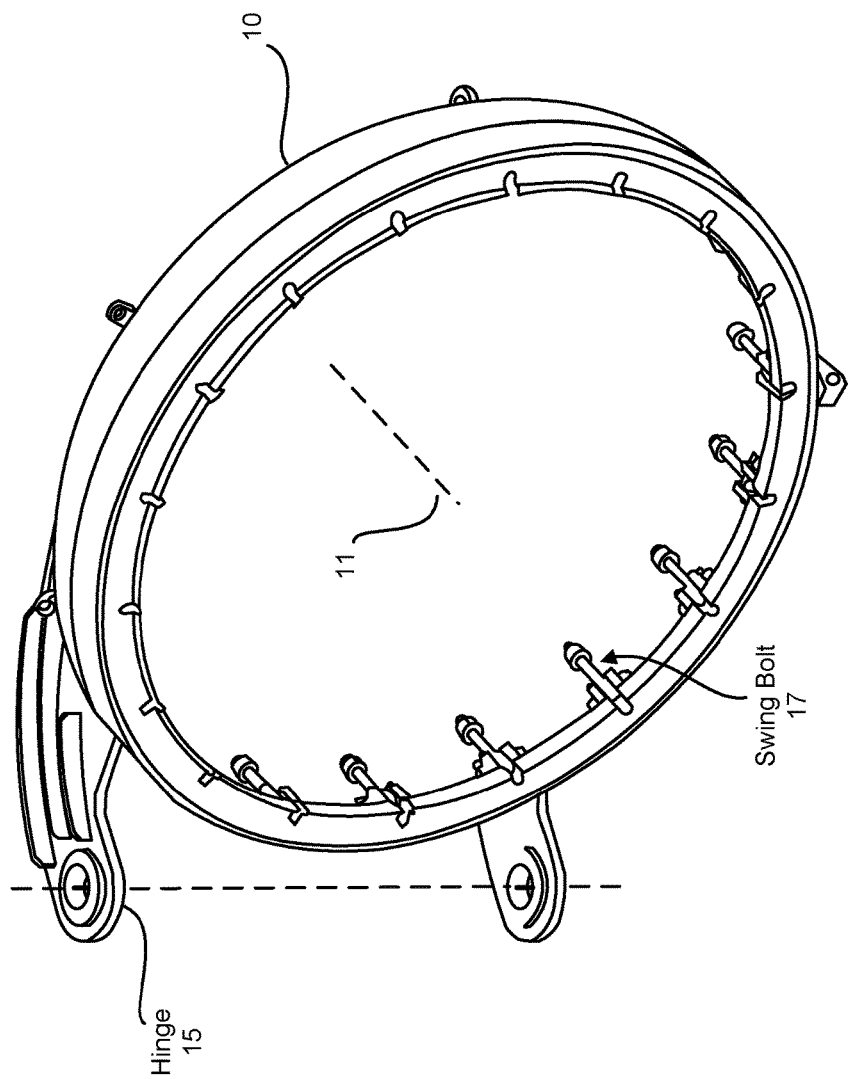
FIG. 2 illustrates a hatch door with a conventional swing bolt locking system.
Figure 3A:
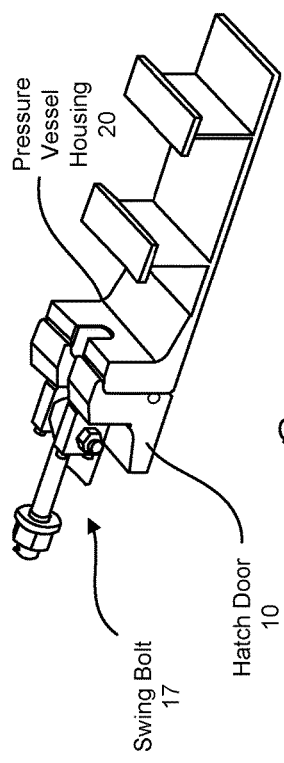
FIGS. 3A-3C illustrate the action of a swing bolt locking device.
Figure 3B:
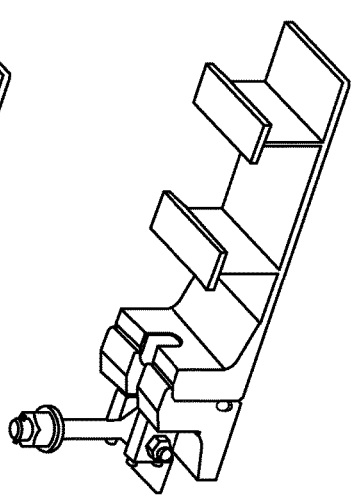
Figure 3C:
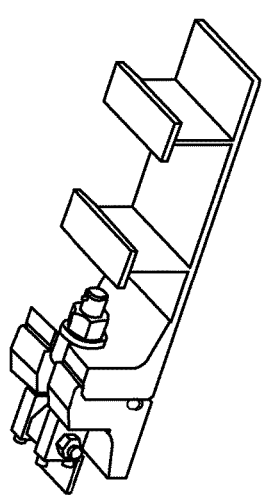
Figure 4:
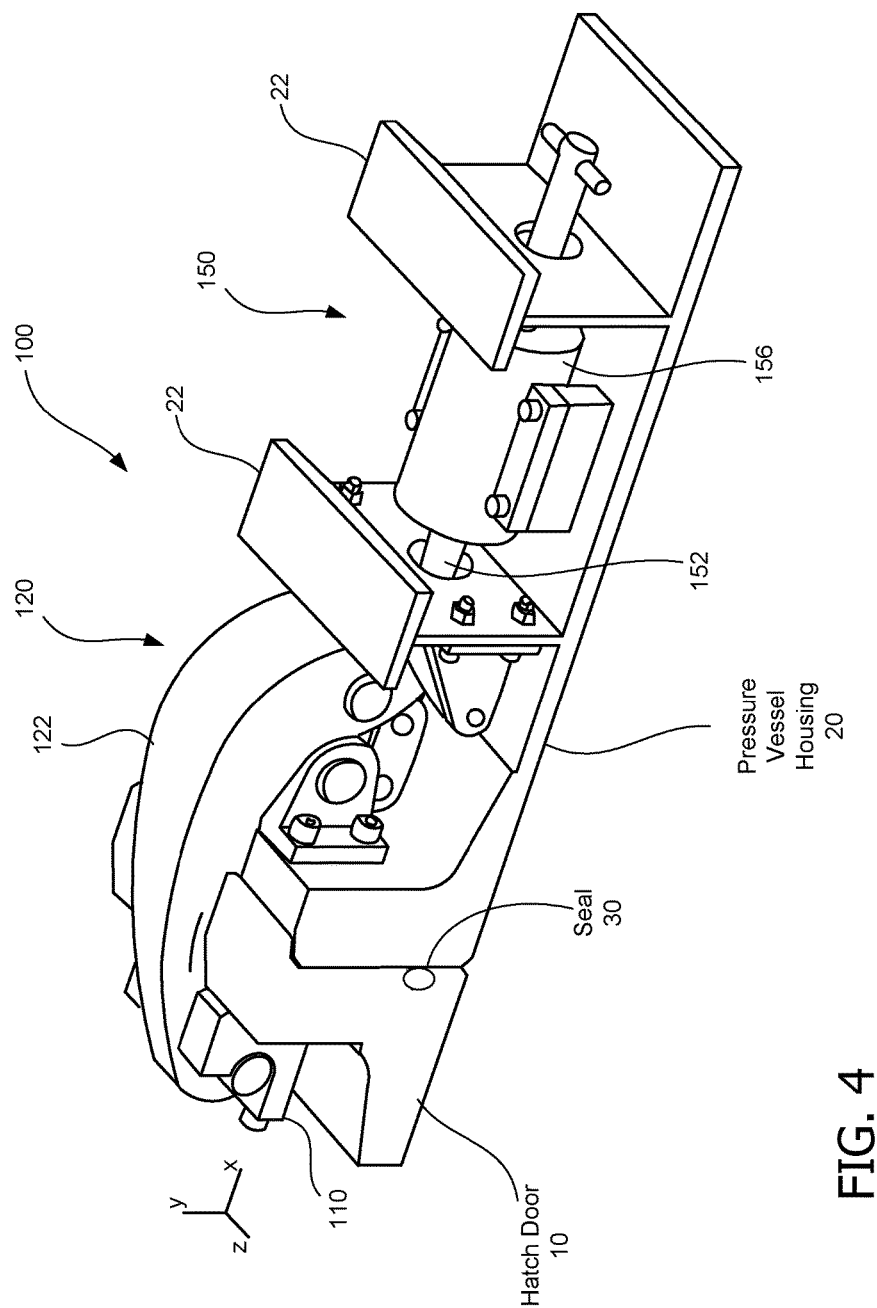
FIG. 4 is a perspective view of a locking device system according to an embodiment of the invention.

A conventional locking system based on the use of internally mounted swing bolts is shown in FIGS. 2-3C. In a conventional locking system, multiple swing bolts 17 are mounted around the internal circumference of the hatch door 10 near a surface configured to meet with a corresponding surface of the main pressure vessel housing 20 when the hatch door 10 is closed. Hatch door 10 may swing about hinge 15, as shown in FIGS. 1A-2. Hatch door 10 may also be said to comprise a central axis 11 since the exemplary hatch door is in a semispherical shape.

FIGS. 3A-3C show perspective views of a segment of the hatch door 10 and the pressure vessel housing 20. In FIGS. 3A-3B, the hatch door 10 is closed but not secured. To secure the hatch door 10 to pressure vessel housing 20, the swing bolt 17 is pivoted from the position shown in FIG. 3A, through the transition position shown in FIG. 3B, to the secured position shown in FIG. 3C. The swing bolt 17 is then tightened inside the pressure vessel housing 20 to provide the desired preload to the locking mechanism.

The swing bolt locking mechanism 17 is simple but has a significant drawback in that it requires manual torquing of each bolt, which, depending on the application, may not be feasible due to space or time constraints. Other conventional a al hatch locking devices may allow for faster operation, but are very heavy and may not be able to provide a required pre-load. Pre-load may be understood to be the load applied to a fastener or locking mechanism as a result of it being installed, before any external loads are applied.

Some drawbacks of conventional systems can be overcome by providing a powered system such as hydraulically operated locking ring or dogging system. The former, however, may be hydraulically inefficient and attaining high pre-loads would be difficult. Hydraulic dogging systems would provide higher preloads, but would be large, complex and heavy.

An ideal locking device is one that can be fully automated and can provide a high preload while minimizing size and weight. Embodiments of the present invention provide a locking mechanism that uses a unique tandem four-bar linkage for conversion of the linear motion of a hydraulic actuator. In one phase of this motion, the linkage produces a high mechanical advantage during over toggle, which serves to provide the desired high preload. Over toggle occurs when the center of latch pivot 121 passes below a line which passes thru the center of the latch pin 123 and the fixed toggle pivot 127. This phase may be referred to as a mechanical advantage phase and in the exemplary locking device, a force of the actuator rod 152 in the distal direction causes a correspondingly greater force of the latch link 122 (or latch pin 123) in the proximal direction by a factor equal to the mechanical advantage of the locking mechanism. In a second phase of linear actuator motion, the linkage produces a high travel-advantage mode that serves to move the latching portion of the mechanism out of the way. This phase may be referred to as a travel advantage phase and in the exemplary locking device, a motion of the actuator rod 152 in the proximal direction causes a correspondingly greater motion of the latch link 122 (or latch pin 123) by a factor equal to the travel advantage of the locking mechanism.

Figure 5:
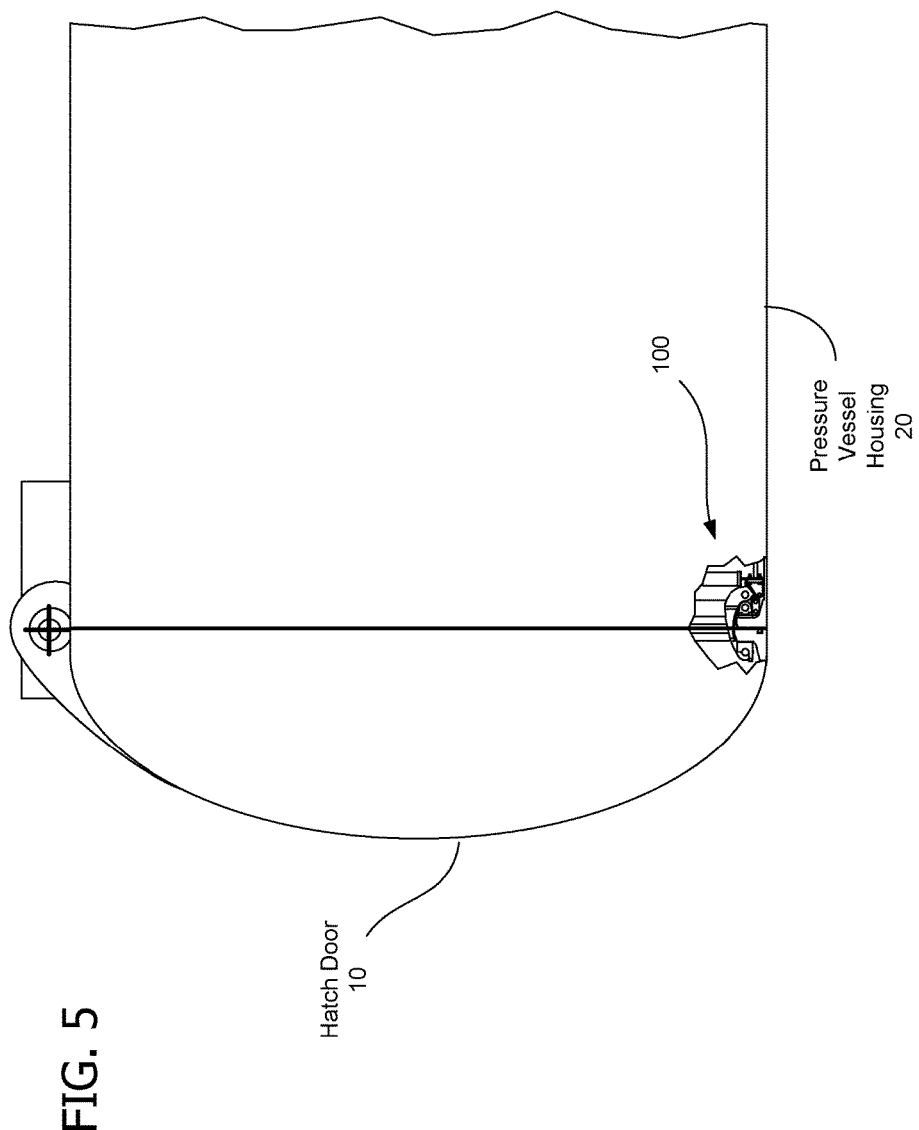
FIG. 5 is a cutaway view of a pressure vessel with a locking device according to an embodiment of the invention securing a hatch door to the pressure vessel housing.

With reference to FIGS. 4-9, a locking device 100 according to an embodiment of the present invention will now be described. For orientation purposes, the term "distal" will be used to describe a direction parallel to the longitudinal axis of the pressure vessel 20 that goes from pressure vessel housing 20 toward the hatch door 10. Thus, in FIG. 5, the hatch door 10 is generally distal to the pressure vessel housing 20. The locking device 100 can be mounted internally to secure a hatch door 10 in a closed position relative to a pressure vessel housing 20 as shown in FIG. 5. A compressive seal 30 may be used to maintain a seal between the door 10 and the housing 20. The locking device 100 comprises a linkage assembly 120 powered by a linear actuator system 150. Collectively, the linkage assembly 120 and the actuator system 150 are configured to automatically drive a latch link 122, which is configured to engage a latch block 110. As illustrated, the linkage assembly 120 and the actuator system 150 are attached to the housing 20 and the latch block 110 is attached to the hatch door 10, but the reverse configuration could also be used.

The actuator system 150 may comprise a hydraulic cylinder 156 to power the actuator rod 152. Electrical or electromagnetic drive mechanisms may also be used in lieu of the hydraulic cylinder 156.

The tandem four bar linkage assembly 120 comprises an L-shaped latching toggle (or crank) 128 (best shown in FIG. 7C) that pivots around a fixed toggle pivot 127 attached to the housing 20 by a pivot bearing 126. The long portion of the L-shaped body of the latching toggle 128 may be referred to as a latch lever arm 128a, and is pivotally attached to the latch link 122 by a latch pivot 121. The short portion of the L-shaped body of the latching toggle 128 may be referred to as a linkage lever arm 128b, and is coupled to a distal end 154 of the actuator rod 152 by a drag link 132. The drag link 132 is pivotally connected to the latching toggle 128 by a link pivot 131 at its distal end and to a distal end 154 of the actuator rod 152 by a second link pivot 133 (FIG. 7D) at its proximal end.

The exemplary latch link 122 is a generally arcuate member that is configured to engage the latch block 110 and maintain a compressive preload to the circumferential flanges at the openings of the hatch door 10 and the housing 20 when the latch link 122 is in an over toggle position. Latch link 122 may be said to comprise a block engagement end 122a and a link pivot end 122b (FIG. 7D). The block engagement end 122a is at a distal end, and the link pivot end 122b is at a proximal end of the exemplary latch link 122. The link pivot end 122b may be coupled to a first linkage or slide stop 138, as discussed below. The exemplary latch link 122 may have a laterally extending latch pin 123 extending from both sides of the latch link 122 at the block engagement end 122a of the latch link 122. The latch block 110 has a pin cradle configured to removably receive the latch pin 123. Latch block 110 may be coupled to hatch door 10 or may be integral with hatch door 10. Accordingly, latch block 110 may be referred to as a latch receiving portion.

Figure 6:
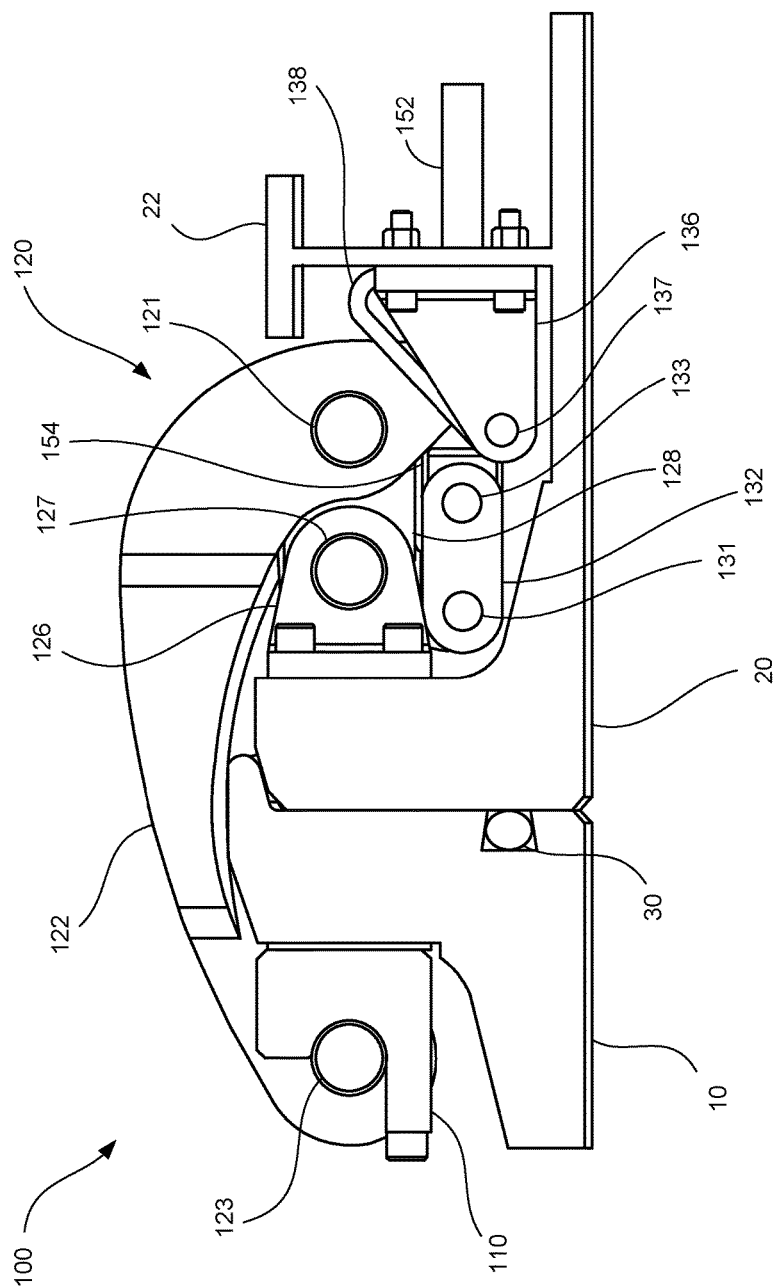
FIG. 6 is a side view of a locking device according to an embodiment of the invention.
Figure 7A:
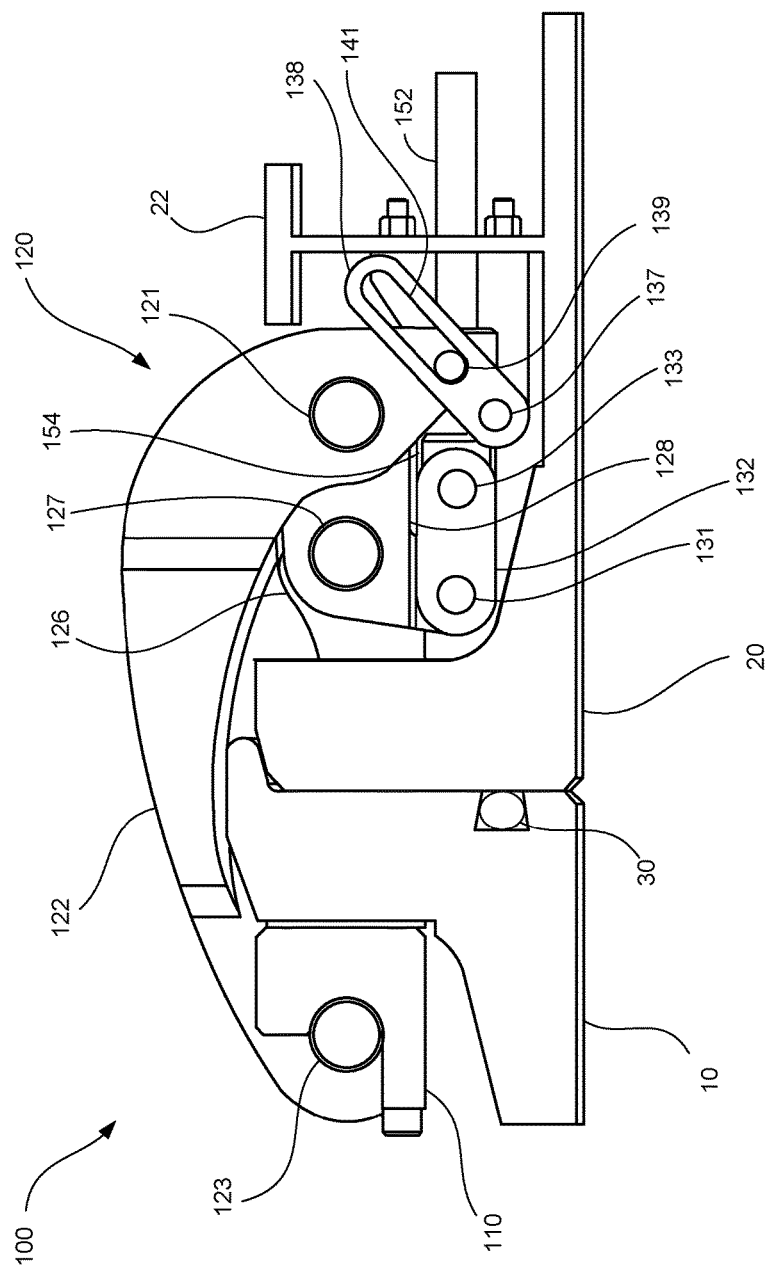
FIGS. 7A-7H are side views of the locking device of FIG. 6 illustrating the sequence of movements associated with the unlocking and opening of a hatch door from a pressure vessel housing.
Figure 7B:
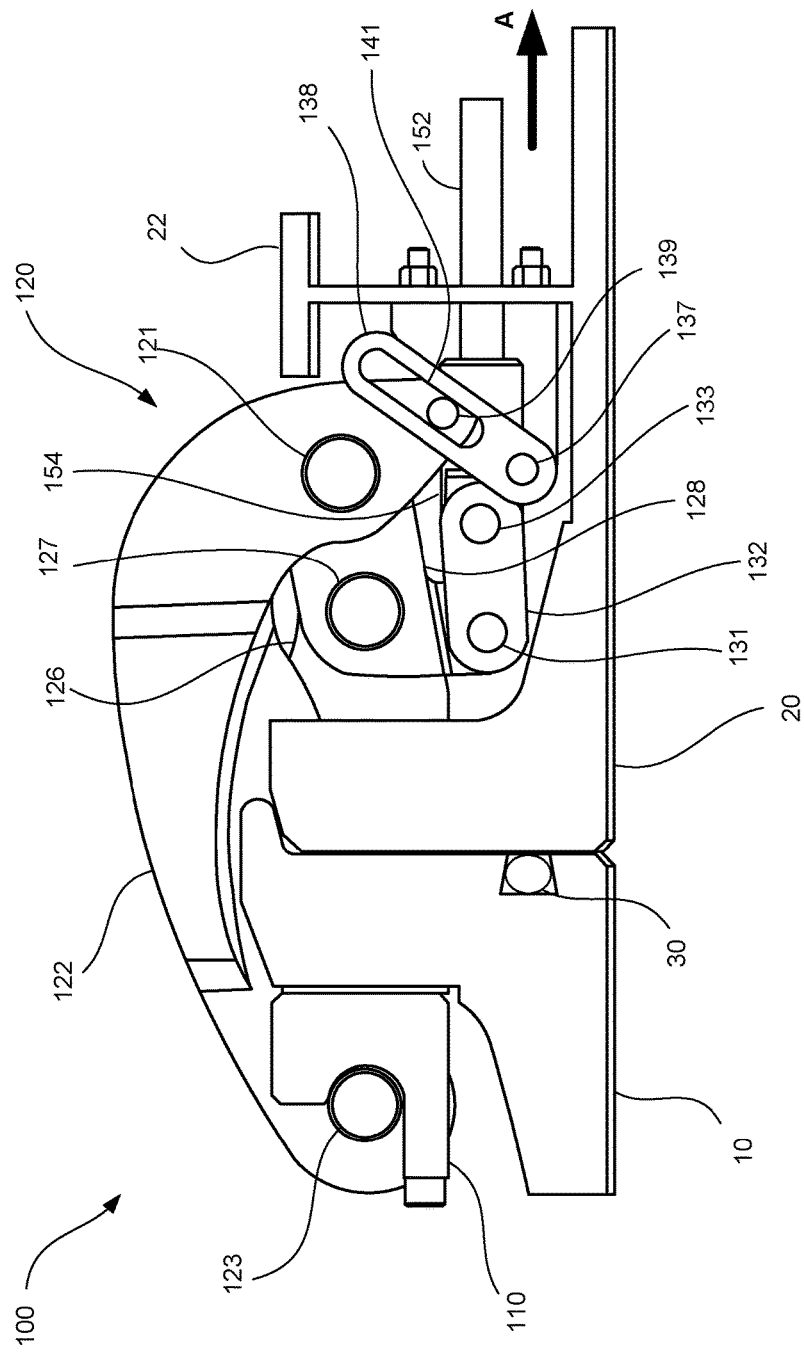
Figure 7C:
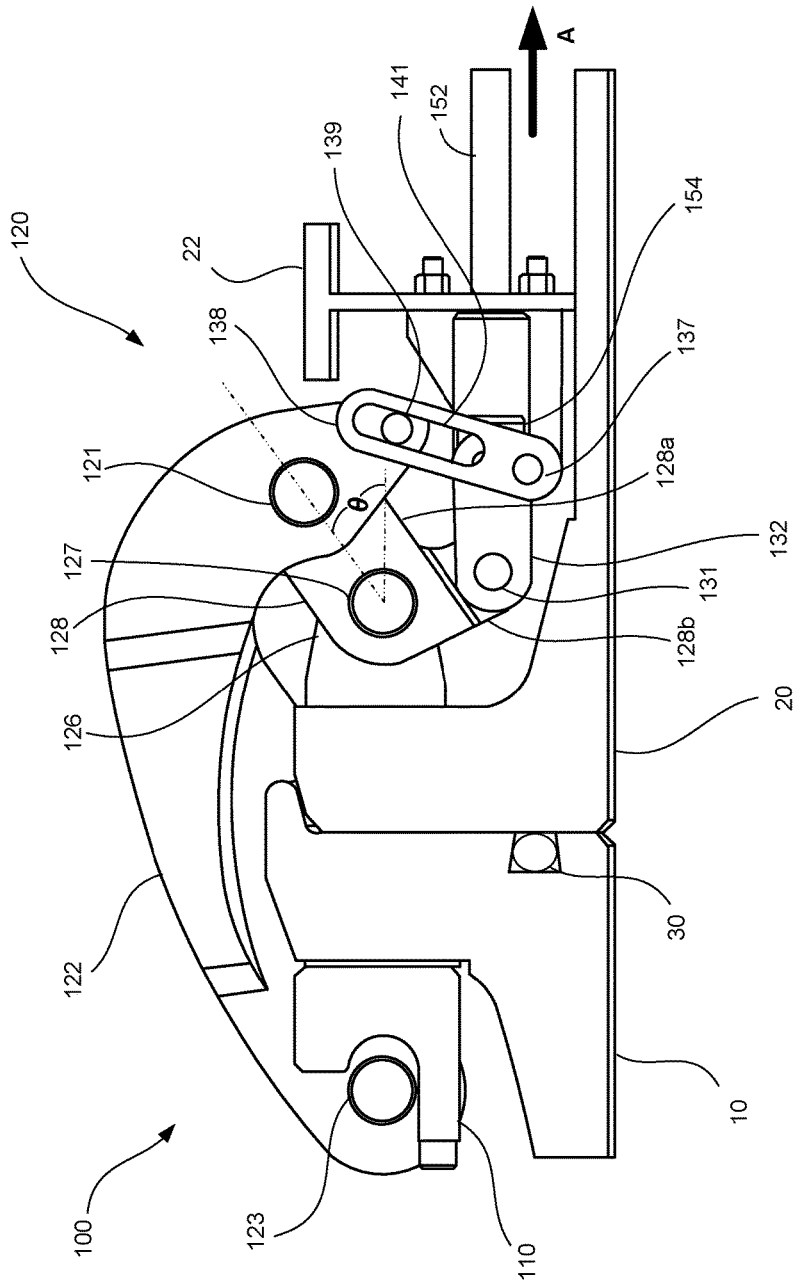
Figure 7D:
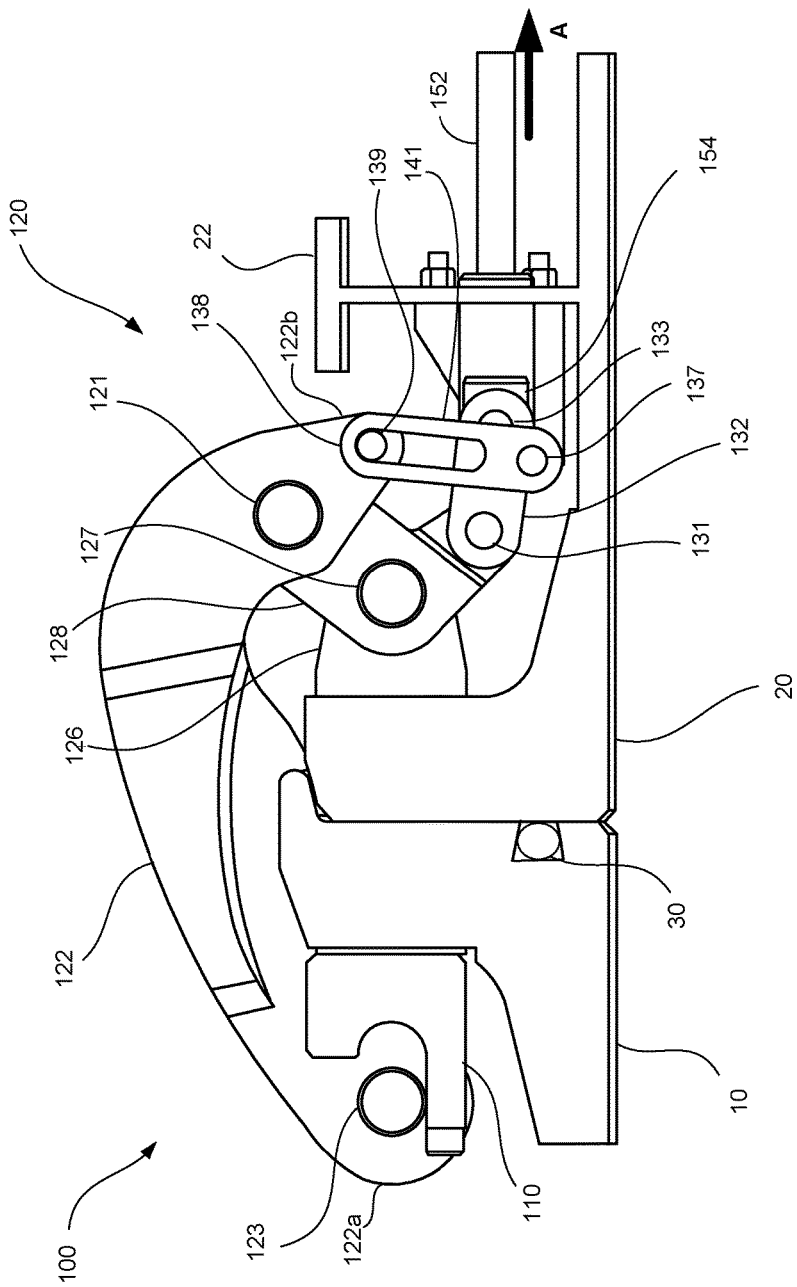

A comparison of FIG. 6 and FIGS. 7A-7H show that the foreground portions of the toggle pivot bearing 126 and the pivot slide bearing 136 are removed so that the action of the linkage can be viewed more easily. As shown in FIG. 7A, the latch link 122 has (or is coupled to) a slide pin 139 extending from both sides of the latch link body 122 adjacent its proximal end. The slide pin 139 is configured to be slidably received in the slot 141 of the slide stop 138. The slide stop 138 is pivotally mounted to a fixed pivot pin 137 held in place by pivot slide bearing 136 (FIG. 6), which is attached to the housing 20. In the illustrated embodiment in FIG. 6, the pivot slide bearing 136 is attached to a structural rib 22 of the housing 20.

The linkage assembly 120 is configured so that proximal motion (in the direction of arrow A) of the actuator rod 152 initiated with the locking device in the locked position, shown in FIGS. 6 and 7A, produces a sequence of motions of the latch link 122 that first causes the distal end of latch link 122 (and latch pin 123) to move translationally in the distal direction (opposite direction of arrow A). Continued proximal motion of actuator rod 152 (in the direction of arrow A) causes the distal end of latch link 122 to move rotationally in a direction roughly toward the longitudinal axis of the pressure vessel (in a clockwise direction). This sequence is described more specifically below, with reference to FIGS. 7A to 7H.

In FIG. 7A, the linkage assembly is shown in an initial locked (over toggle) position with latch pin 123 engaging the pin cradle of latch block 110. When in the locked position, high preloads may be present, thereby securely locking hatch door 10 closed with respect to housing 20. Force on the actuator rod 152 in the distal direction causes high preloads to be applied at the distal end of the latch link 122, or more specifically, between latch pin 123 and latch block 110. The linkage assembly is structured such that distal force on the actuator rod 152 causes proximal force on the latch pin 123 and at a greater degree.

In FIG. 7B, proximal motion of actuator rod 152 (in the direction of arrow A) causes latching toggle 128 to rotate (counter-clockwise in FIG. 7B). Slide stop 138 limits rotation of latch link 122.

In FIG. 7C, continued proximal motion of actuator rod 152 in the direction of arrow A causes continued counter-clockwise rotation of latching toggle 128. Rotation of slide stop 138 allows distal translational motion of latch link 122, causing latch pin 123 to disengage from the pin cradle of latch block 110.

In FIG. 7D, continued proximal motion of actuator rod 152 in the direction of arrow A causes continued counter-clockwise rotation of latching toggle 128 and latch link slide pin 139 eventually reaches the end of slide stop slot 141, at which point latch pin 123 reaches an end of its distal translation (in a direction opposite arrow A).

Figure 7E:
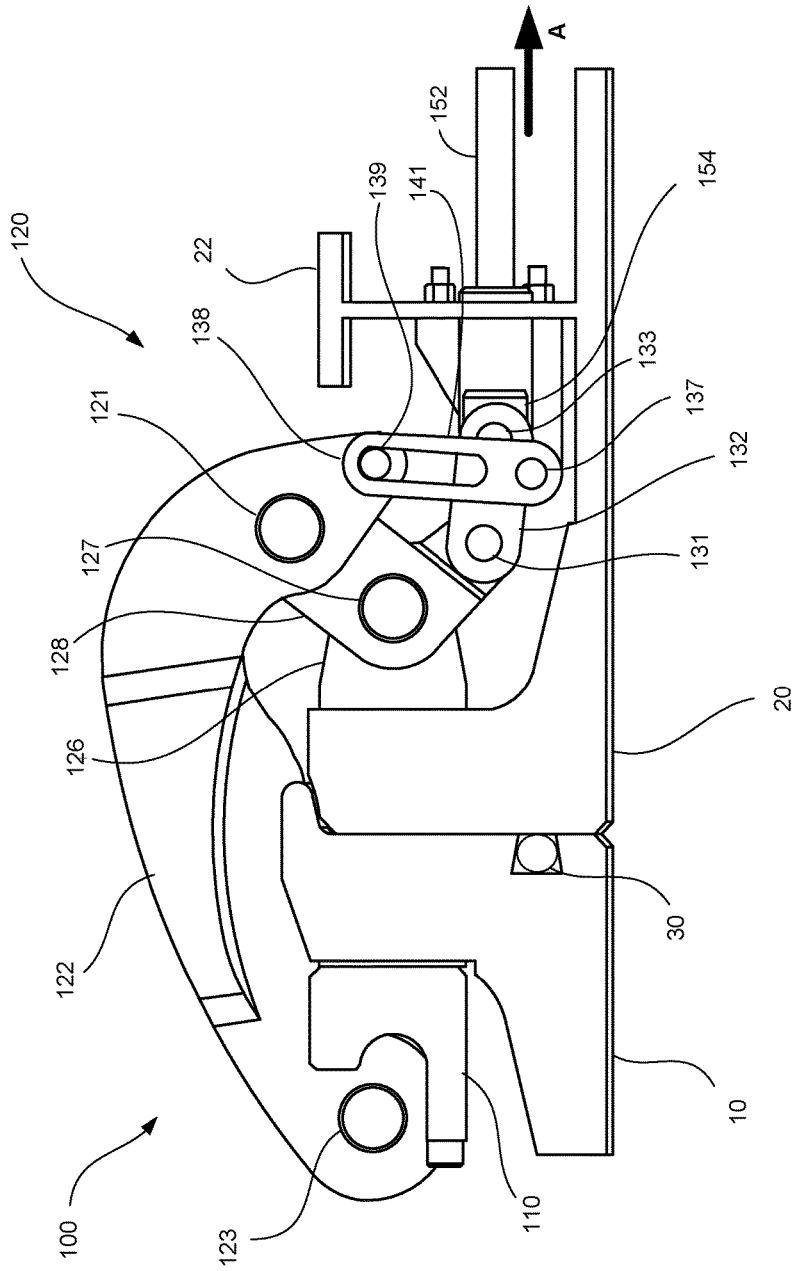

In FIG. 7E, continued proximal motion of actuator rod 152 in the direction of arrow A causes slight continued counter-clockwise rotation of latching toggle 128 and latch link 122 begins to rotate clockwise around latch pivot 121, causing latch pin 123 to lift away from latch block 110. In other words, latch pin 123 had been moving distally, but now is moving upwards, away from latch block 110.

Figure 7F:
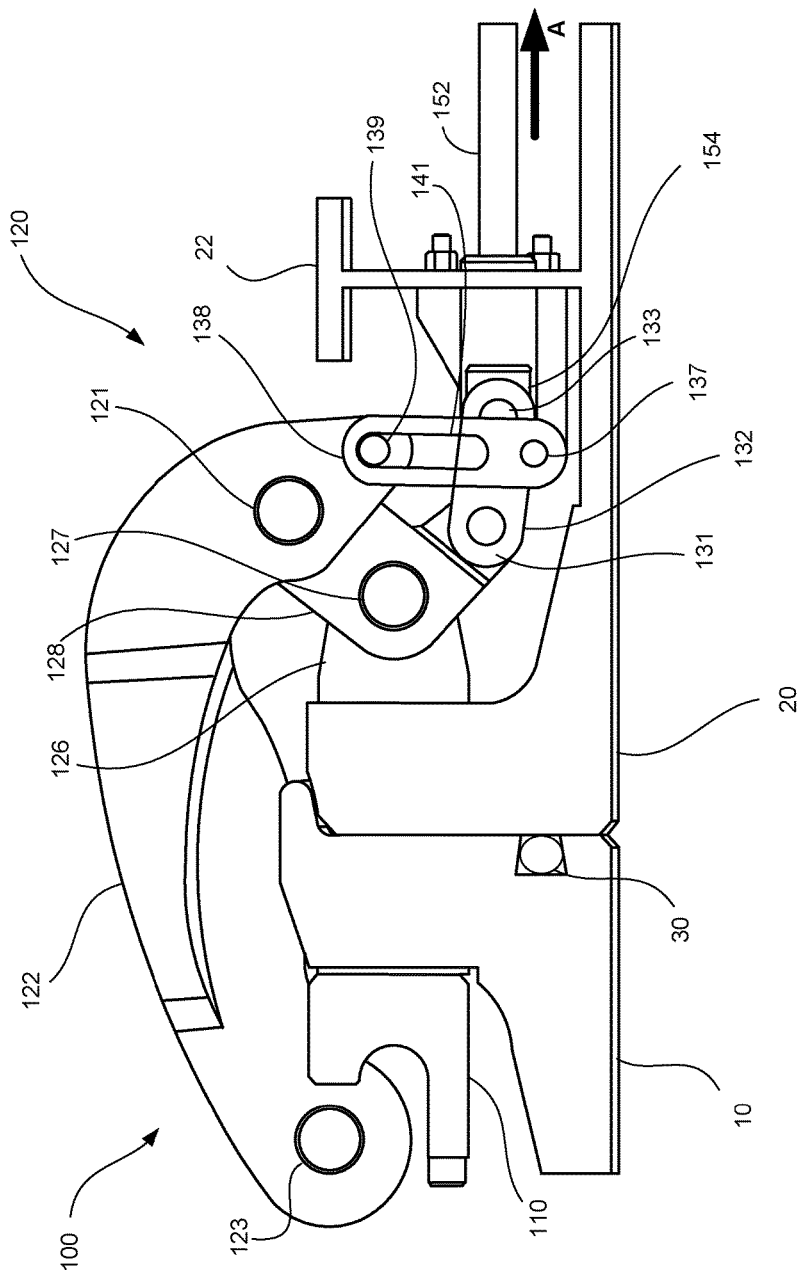

In FIG. 7F, continued proximal motion of actuator rod 152 in the direction of arrow A causes the latch link 122 to continue to rotate clockwise around latch pivot 121. Latch pin 123 thereby continues to lift away from latch block 110 as latch link 122 rotations clockwise.

Figure 7G:
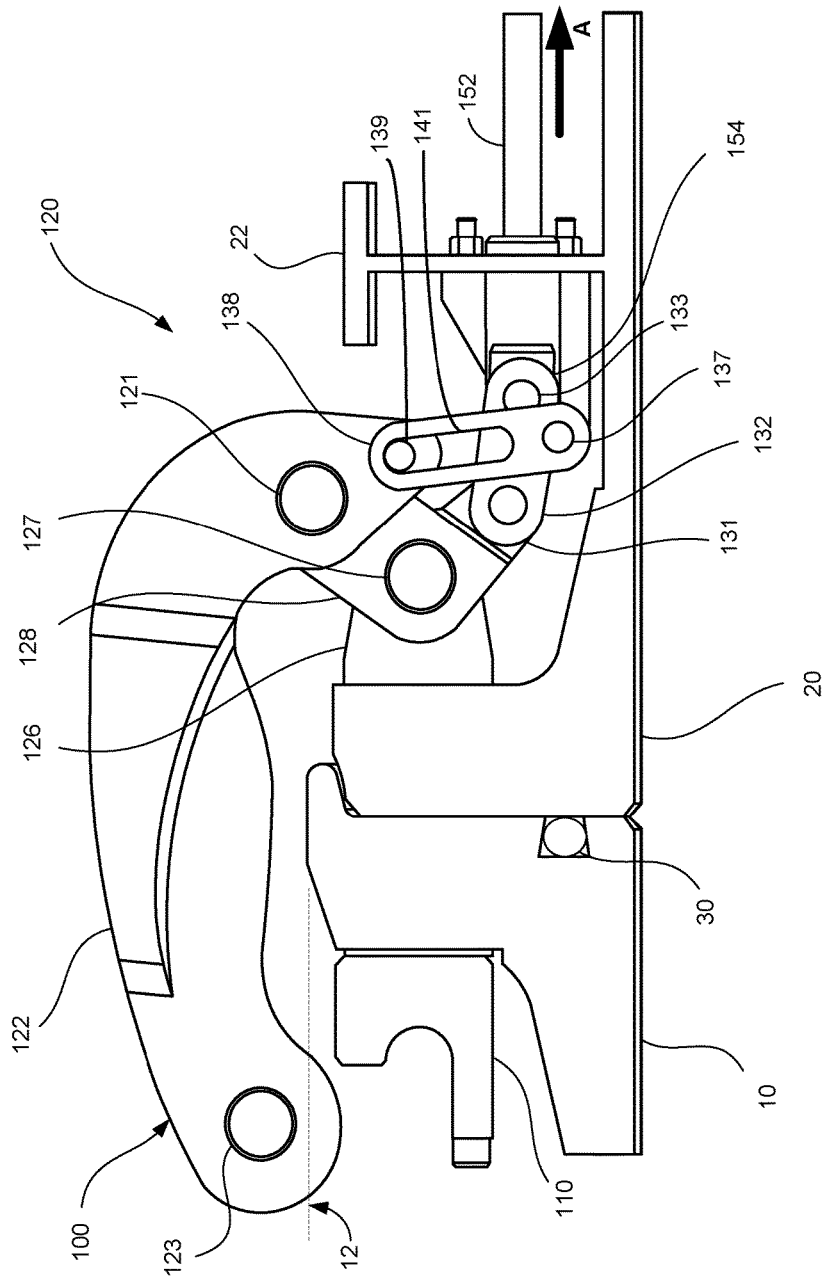

FIG. 7G shows the unlocked position and the end of proximal motion of actuator rod 152 in the direction of arrow A. Rotation of latch link 122 has completed and latch pin 123 has been raised sufficiently high enough to clear a path and upper plane 12 of the hatch door flange when the hatch door 10 is opened.

Figure 7H:
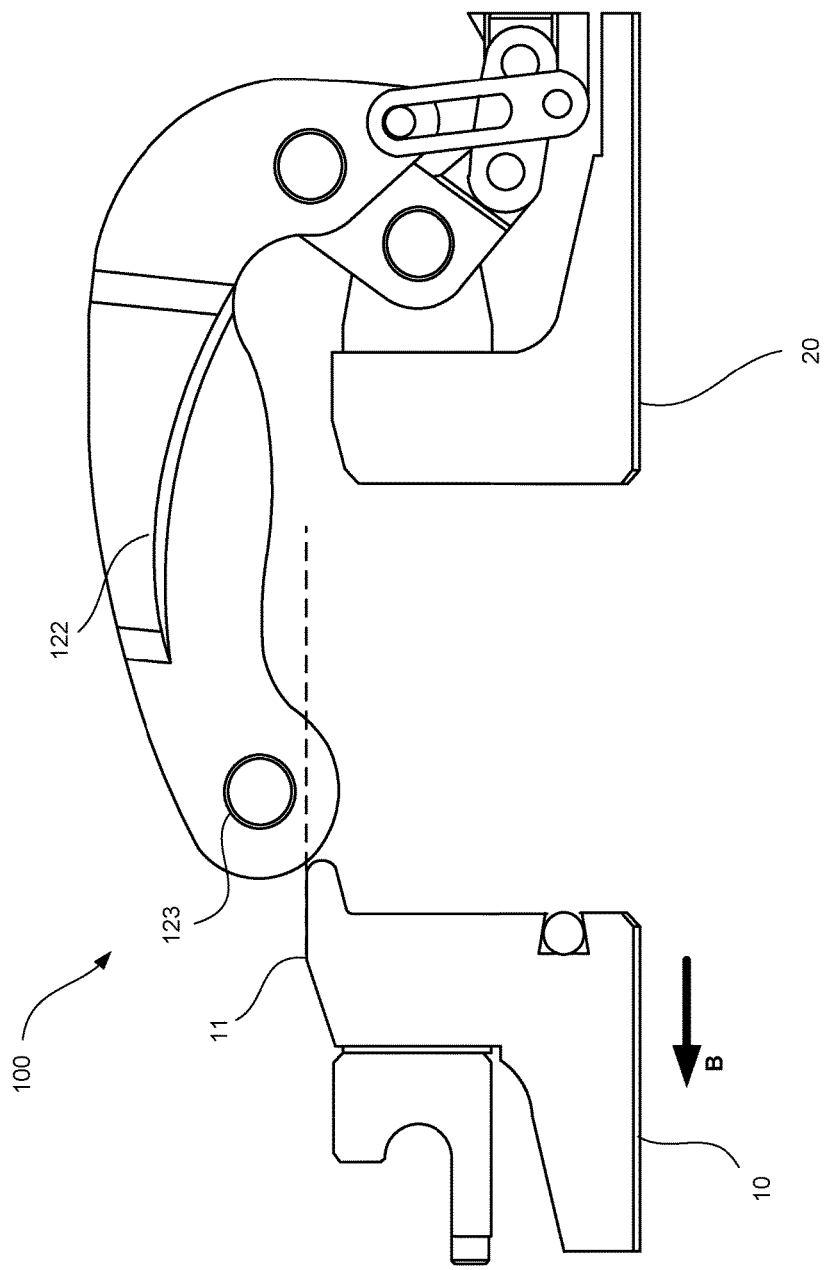

In FIG. 7H, hatch door 10 is moved distally toward the open position shown in FIG. 1B. The opening motion of the hatch door 10 is represented by travel in the direction of arrow B.

The tandem four-bar linkage system according to the exemplary embodiment of the present invention produces a high mechanical advantage (e.g., high preload) during over toggle (i.e., when in the locked position), then switches to a high travel advantage (i.e., high translational motion) to move the latch out to the way so the door can be opened. All of this occurs with linear motion of actuator rod 152 or force applied to actuator rod 152. More specifically, force applied to the actuator rod 152 in the distal direction produces the high mechanical advantage during over toggle, and motion of the actuator rod 152 in the proximal direction produces the high travel advantage. This tandem action minimizes the hydraulic demand (i.e., actuator size) compared to traditional operating devices where the actuator bore diameter is dictated by the maximum force requirement, and the stroke is dictated by total movement required by the mechanism. The traditional approach results in low hydraulic efficiency because a large percentage of the actuator stroke occurs when relatively little force is required; in other words, there is low travel advantage.

In the exemplary embodiment, total travel of the actuator rod is very limited. For example, in an exemplary locking device 100 in which the latch link has a chord length (i.e., the distance between the latch pivot 121 and the latch pin 123) of about 11 inches, the total travel of the actuator rod is only about 2.5 inches. It should be noted, however, that the locking device 100 is not limited to a particular size or span. The travel advantage will vary depending on the particular application, or configuration, for which the locking device is designed.

FIGS. 8A-8B show how travel of the actuator rod 152 compares travel of latch link for example. As actuator rod 152 travels a distance of ΔL in a horizontal direction, a distal end of latch link 122 travels a distance of ΔH a vertical direction, which distal substantially larger than ΔL. This is referred to as travel advantage ("TA"). In one linkage mechanism according to the exemplary embodiment, the actuator rod traveled 0.207 in and the latch link traveled 2.84 in. Thus, in this example, the travel advantage may be represented by the following equation:

$$TA = \frac{\text{Link Movement}}{\text{Actuator Movement}} = \frac{\Delta H}{\Delta L} = \frac{2.84}{0.207} = 13.7$$

As explained above, the exemplary linkage develops a high travel advantage by using the pivot slide stop 138, among other linkages. For motion in the reverse direction, a high preload is established by trading actuator travel for mechanical advantage. In short, the locking sequence for the device 100 that results in a high preload is the reverse of the above-described unlocking sequence.

Figure 9:
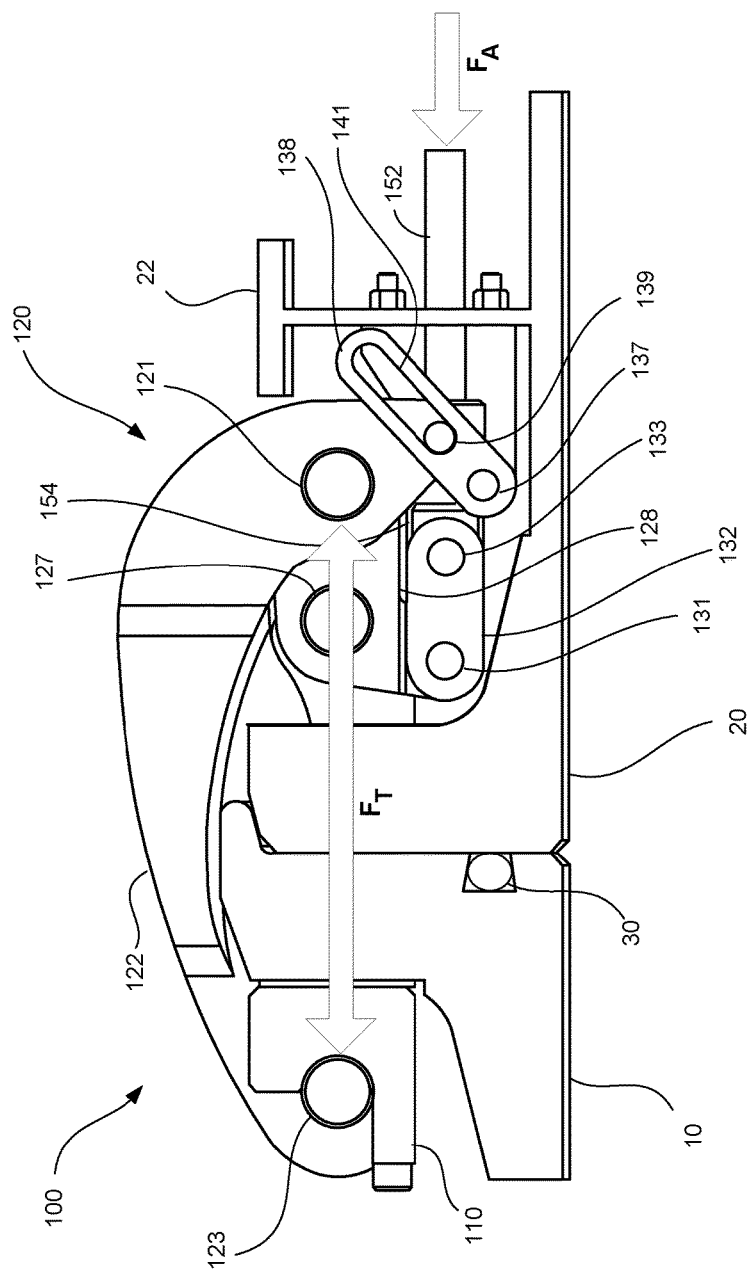
FIG. 9 is an illustration of the locking device depicting mechanical advantage.

Mechanical advantage for the exemplary linkage may be defined as the maximum latch link tension divided by the maximum actuator force. In FIG. 9, the latch link tension and actuator force are represented by arrows labeled $F_T$ and $F_A$, respectively. Thus, mechanical advantage may be represented as $MA = F_{T\ max}/F_{A\ max}$. An exemplary linkage was found to have a maximum latch link tension of approximately 80,000 lbf and a maximum actuator force of approximately 14,000 lbf, yielding a mechanical advantage of 5.7.

The linkage components may be formed from any material having sufficient strength for a given application. A typical material for high strength applications is 17-4 PH stainless steel (ASTM A 705, Type 630, condition H1150). Further, a plurality of locking devices 100 may be used to secure a particular hatch door or other closure and all of such locking devices 100 may be under common control so that they may be operated simultaneously or in a desired sequence.

In summary, the locking device according to an exemplary embodiment of the invention can open and close faster than traditional manually operated locking devices, does not require manual tightening once in the secured position, weighs less, takes up less space than traditional powered locking devices, minimizes hydraulic requirements compared to traditional powered locking devices, and provides an exceptionally high preload, thereby securing two members together despite potentially high pressure differentials. The device can also be used to retrofit existing systems or otherwise replace existing locking devices. The exemplary locking device minimizes hydraulic requirements (e.g., total volume of hydraulic fluid) by using both mechanical advantage and travel advantage to limit the actuator force and actuator travel required to secure a hatch door, for example, to a vessel housing. The locking device according to the exemplary embodiment of the invention can be used in applications that require automated locking systems and high preload and which have limited hydraulic capability.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

While the foregoing illustrates and describes exemplary embodiments this invention, it is to be understood that the invention is not limited to the construction disclosed herein. The invention can be embodied in other specific forms without departing from the spirit or essential attributes.

What is claimed is:

1. A locking device for locking a first body having a first longitudinal axis to a second body having a second longitudinal axis, the first body and the second body being positionable in a body locking configuration in which the first body is in contact with and distal to the second body and in which the second longitudinal axis is parallel to or collinear with the first longitudinal axis, the locking device comprising:

a latch link having a distal latch link end and a proximal latch link end, a latch pin adjacent the distal latch link end, and a slide pivot pin adjacent the proximal latch link end, the latch link being couplable to the second body by the slide pivot pin and a first linkage arrangement;

a latch receiving portion attachable to the first body, the latch receiving portion being configured for engagement by the latch pin;

an L-shaped latching toggle having a latch lever arm and a linkage lever arm extending laterally from a first end of the latch lever arm, a second end of the latch lever arm being pivotably attached to the latch link by a latch pivot positioned intermediate the latch pin and the slide pivot pin, the L-shaped latching toggle being pivotably attachable to the second body at a fixed toggle pivot; and a linear actuator having an actuator rod, the linear actuator being attachable to the second body the actuator rod is selectively translatable distally and proximally along a fixed line parallel to the second longitudinal axis, the actuator rod being operatively coupled to the linkage lever arm by a second linkage arrangement, wherein the locking device has an installed condition in which the latch link is coupled to the second body by the slide pivot pin and the first linkage arrangement, the latch receiving portion is attached to the first body, the L-shaped latching toggle is pivotably attached to the second body at the fixed toggle pivot, and the linear actuator is attached to the second body so that the actuator rod is selectively translatable distally and proximally along the fixed line parallel to the second longitudinal axis, wherein when the locking device is in its installed condition and the first and second bodies are in the body locking configuration, the locking device has an unlocked configuration in which the latch pin is in an unlocked position spaced apart from the latch receiving portion and a locked configuration in which the latch pin is in a locked position where the latch pin is in engagement with the latch receiving portion and in which the latch link is in an over toggle condition such that the latch pin applies a proximal force to the latch receiving portion, wherein when the locking device is in the locked configuration, proximal translation of the actuator rod causes the latch pin to move toward its unlocked position, and wherein when the locking device is in the unlocked configuration, distal translation of the actuator rod causes the latch pin to move toward its locked position.

2. The locking device of claim 1, wherein the unlocked position of the latch pin is spaced apart from its locked position both distally and in a direction orthogonal to the first longitudinal axis.

3. The locking device of claim 1, wherein the locking device applies a compressive closure load on the first and second bodies when the latch link is in the locked position.

4. The locking device of claim 2, wherein the first and second linkage arrangements are configured so that when the locking device is in the unlocked configuration, distal translation of the actuator rod causes, in sequence:
   rotational motion of the distal latch link end in a travel advantage phase, and
   proximal linear motion of the distal latch link end in a mechanical advantage phase, the proximal linear motion of the distal latch link end causing the latch pin to move in a proximal direction to engage the latch receiving portion, thereby placing the locking device in the locked configuration.

5. The locking device of claim 4, wherein the first linkage arrangement comprises a slide stop link pivotably attached at a first end to a fixed pivot pin that is fixed with respect to the second body when the locking device is in its installed condition, and pivotably and slidably attached to the slide pivot pin at a second end.

6. The locking device of claim 1,
   wherein the first body is a hatch door having an internal hatch surface and the second body is a pressure vessel housing having an internal housing surface, the hatch door and the pressure vessel housing forming a closed vessel when positioned in the body locking configuration,
   wherein the latch receiving portion is mountable to the internal hatch surface and the latch link, L-shaped latching toggle, first and second linkage arrangements, and linear actuator are collectively mountable to the internal housing surface so that the locking device is fully enclosed within the closed vessel when the hatch door and the pressure vessel are positioned in the body locking configuration.

7. The locking device of claim 1, wherein the latch pin extends laterally from the latch link and wherein the latch receiving portion comprises a concavity configured for reception of and mating engagement with the latch pin, the concavity facing in a distal direction when the locking device is in the installed condition.

8. The locking device of claim 4, wherein the over toggle condition is established when a center of the latch pivot passes below a line defined by a center of the latch pin and a center of the fixed toggle pivot.

9. The locking device of claim 1, wherein the latch receiving portion comprises a latch block attachable to the first body.

10. The locking device of claim 1, wherein the linear actuator is a hydraulic actuator.

11. The locking device of claim 1, wherein the linear actuator is an electric or electromagnetic drive mechanism.

12. The locking device of claim 1, wherein the second linkage arrangement comprises a drag link pivotally connected at a first drag link end to the linkage lever arm, and pivotally connected at a second drag link end to the actuator rod.

13. The locking device of claim 1, wherein the latch link is arcuate in shape and the proximal latch link end is adjacent a distal end of the actuator rod.

14. The locking device of claim 2, wherein the first and second linkage arrangements are configured so that when the locking device is in the locked configuration, proximal linear motion of the actuator rod causes, in sequence:
   distal linear motion of the latch link, which causes the latch pin to move in a distal direction to disengage from the latch receiving portion, and
   rotational motion of the latch link, which causes the latch pin to move, at least in part, in the direction orthogonal to the first longitudinal axis.

15. A locking device for locking a first body having a first longitudinal axis to a second body having a second longitudinal axis, the first body and the second body being positionable in a body locking configuration in which the first body is in contact with and distal to the second body and in which the second longitudinal axis is parallel to or collinear with the first longitudinal axis, the locking device comprising:
   a latch link having a distal latch link end and a proximal latch link end;
   a latch pin attached to the latch link adjacent the distal latch link end;
   a latch pivot pin attached to the latch link adjacent the proximal latch link end, the latch pivot pin being couplable to the second body by a first linkage arrangement;
   a latch receiving portion attachable to the first body, the latch receiving portion being configured for engagement by the latch pin;

an L-shaped latching toggle pivotably attachable to the second body at a fixed toggle point and having a first end pivotably attached to the latch link intermediate the latch pin and the latch pivot pin; and a linear actuator having an actuator rod operatively coupled to a second end of the L-shaped latching toggle by a second linkage arrangement, the linear actuator being attachable to the second body so that the actuator rod is selectively translatable along a fixed line parallel to the second longitudinal axis wherein the first and second linkage arrangements are configured so that when the locking device is operatively installed on the first and second bodies and the first and second bodies are in the body locking configuration, the locking device has an unlocked configuration in which the latch pin is in an unlocked position spaced apart from the latch receiving portion and a locked configuration in which the latch pin is in a locked position in engagement with the latch receiving portion and in which the latch link is in an over toggle condition such that the latch pin applies a proximal force to the latch receiving portion, wherein when the locking device is in the locked configuration, proximal translation of the actuator rod causes the latch pin to move toward its unlocked position, and wherein when the locking device is in the unlocked configuration, distal translation of the actuator rod causes the latch pin to move toward its locked position.

16. A locking device according to claim 15, wherein the unlocked position of the latch pin is spaced apart from its locked position both distally and in a direction orthogonal to the first longitudinal axis.

17. A locking device according to claim 15, wherein the first and second linkage arrangements are configured so that when the locking device is in the unlocked configuration, distal translation of the actuator rod causes, in sequence:

rotational motion of the distal latch link end in a travel advantage phase, and proximal linear motion of the distal latch link end in a mechanical advantage phase, the proximal linear motion of the distal latch link end causing the latch pin to move in a proximal direction to engage the latch receiving portion, thereby placing the locking device in the locked configuration.

* * * * *